Aug. 20, 1968     T. M. ENGLE     3,398,085
CATALYST ADDITION AND WITHDRAWAL PROCESS
Filed Sept. 14, 1965
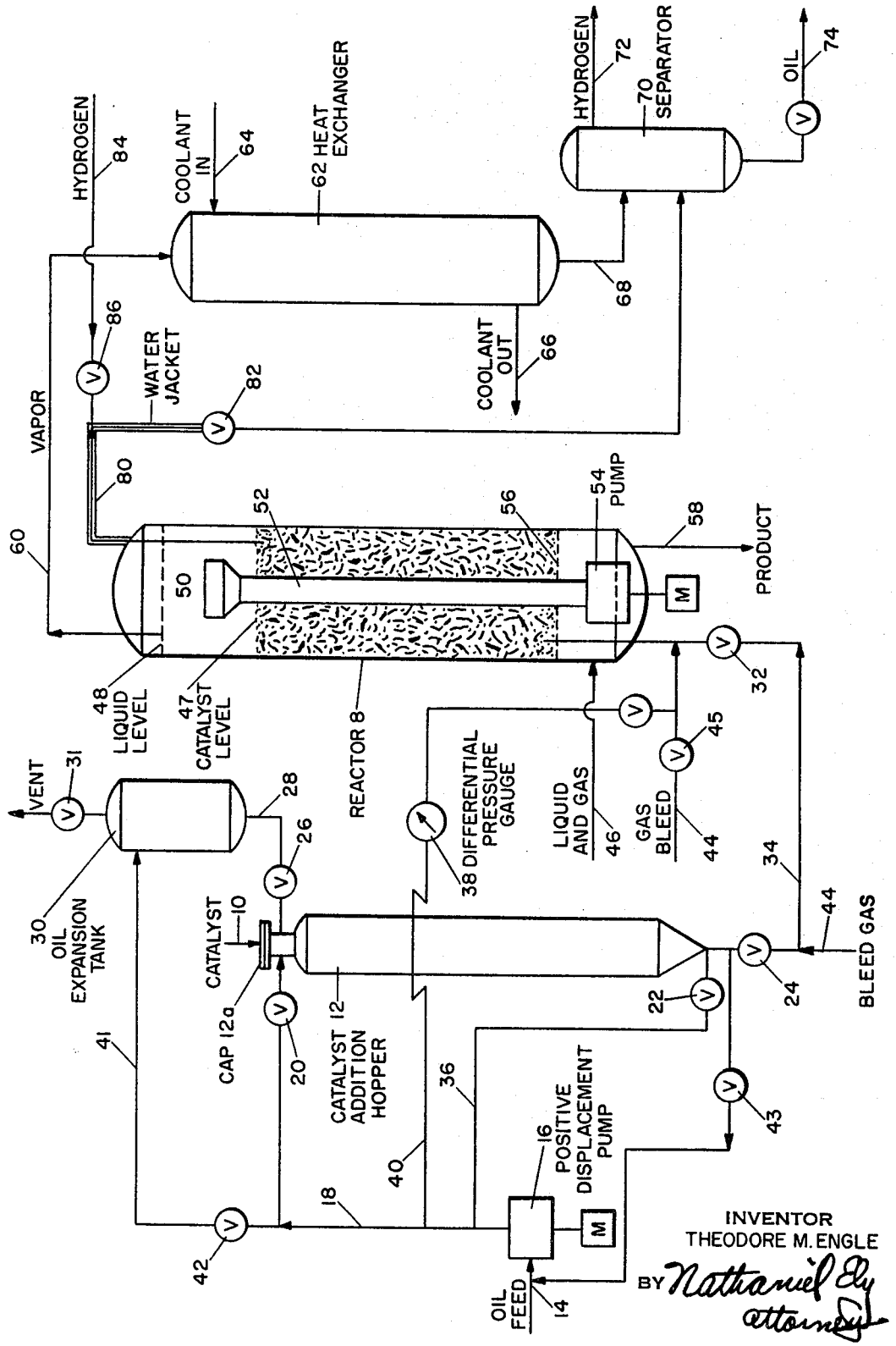
INVENTOR
THEODORE M. ENGLE
BY Nathaniel Ely
attorney

United States Patent Office 3,398,085
Patented Aug. 20, 1968

3,398,085
CATALYST ADDITION AND WITHDRAWAL
PROCESS
Theodore M. Engle, Lambertville, N.J., assignor to Hydrocarbon Research, Inc., New York, N.Y., a corporation of New Jersey
Filed Sept. 14, 1965, Ser. No. 487,197
8 Claims. (Cl. 208—157)

ABSTRACT OF THE DISCLOSURE

A method for maintaining an average inventory of particulate solids in a pressurized reaction zone without substantial pressure drop during addition or removal of the solids by removing the solids from the reaction zone into a lower pressure zone under control of a gas which is at reaction zone pressure and replenishing the solids in the reaction zone at a rate corresponding to the solids removal by introducing these solids into a holding zone, purging the holding zone of atmospheric gases contained therein by filling the zone with oil and then sealing the zone, and then pressurizing the holding zone to a pressure about the same as the reaction zone by pumping oil into the sealed holding zone and then transferring the particulate solids in the holding zone to the reaction zone by continuously pumping the oil from the holding zone into the reaction zone.

---

This invention relates to improvements in the operation of catalytic reactors particularly of the liquid phase type.

In various catalytic reactors and similar reaction systems, it is usually necessary from time to time or continuously, to introduce a particulate solids, which may be a catalyst, to the reactor and in due course to remove the solid from the reactor.

For continuous operation, it usually makes little difference whether the solid is introduced into the reactor in a relatively fine size or whether it is introduced to the reactor in relatively large size, i.e., from 3–60 mesh (Tyler) particles. The important factor is the necessity of accomplishing this addition without shutting down the reactor. In high pressure hydrogenation operations such as disclosed in the U.S. Patent 2,987,465 to Johanson, this becomes extremely difficult. One of the reasons for such difficulty is that the gases such as hydrogen are continuously passed through the reactor and it is necessary in shutting down the reactor to purge the hydrogen to avoid explosions. Another difficulty is that the reactor is frequently operated at 1000 to 10,000 pounds per square inch gauge (p.s.i.g.), and the time required for accomplishing a change of catalyst becomes a very large part of a reaction cycle.

In the past, it has been necessary to use so-called steel chambers or pressure pots which were periodically filled and pressurized and then discharged into the reactor. This requires large size vessels and valves and invariably results in some attrition of the catalyst.

The principal object of my invention is to simplify the addition and withdrawal of particulate material such as catalyst in a pressurized reaction system.

More particularly, my invention pertains to continuous or intermittent transfer of solids into and out of a reactor operated under relatively high pressures.

Other objects and advantages of my invention will appear from the following description of a preferred form of embodiment thereof taken in connection with the attached drawing which is a schematic view of a solids transfer system.

As more particularly shown in the drawing, the reactor 8 is similar to the reactor 5 shown in the Johanson Patent 2,987,465; or the reactor 9 shown in the Garbo Patent 3,151,060, and is adapted to carry out a gas-liquid-solid contact such as the liquid phase hydrogenation of hydrocarbons in the presence of a catalyst.

The periodic or continuous introduction and removal of particulate solids of contact material is accomplished by the following steps and mechanism:

Step 1.—Fill hopper 12

Catalyst from a suitable storage hopper is discharged through a line 10 into a catalyst addition hopper or holding zone 12 by removing the cap or flange 12a and filling the hopper under atmospheric conditions. Conveniently, the catalyst addition hopper 12 is also approximately half full of oil.

Step 2.—Purge hopper 12

When substantially filled with catalyst, the cap 12a is replaced and the unit is then completely filled with oil from the oil feed line 14 through the positive displacement pump 16. This, in turn, discharges oil through the line 18 and open valve 20. The valves 22 and 24 being closed, and valve 26 opened, the air in the system is discharged through the valve 26 and line 28 into the oil expansion tank 30.

Step 3.—Transfer catalyst to reactor 8

After the hopper 12 is filled with catalyst and purged of air and valve 26 is closed, valves 24 and 32 are opened; the pump 16 is operated and the catalyst is then transferred through the conduit 34 as a liquid phase transport line into the bottom of the reactor 8.

If the catalyst is being transferred too rapidly, valve 22 can be opened to bypass some of the liquid from pump 16 through the line 36 and thereby maintaining the optimum linear velocity in the transfer line 34.

Step 4.—Depressure hopper 12

When all the catalyst has been transferred from the catalyst addition hopper 12, differential pressure gauge 38 in line 40 will show a reduced reading due to the lowered resistance in the flow of oil due to absence of catalyst. The clean oil through lines 14 and 18 is continued through the hopper 12 and transfer line 34 to allow closing of the valves 24 and 32 in a clean oil stream.

Pump 16 is then shut down, valve 20 is closed (as are valves 22 and 24) and the catalyst hopper is depressurized by allowing the oil and gas therein to pass through valve 26 and line 28 into the oil expansion tank 30. Valve 31 is opened to vent the gases to atmosphere.

About one half of the oil is then pumped from the catalyst addition hopper 12 into the oil expansion tank 30 by means of the bypass line 41 and valve 42 and valve 43. After valve 42 is closed, the cap 12a from the catalyst addition hopper 12 may again be removed and catalyst again charged to the catalyst addition hopper 12.

The catalyst under consideration is from a mesh size of 10 to 200 (Tyler scale) although particles of a somewhat larger size up to ¼ inch can be handled in a similar manner if a bleed gas such as 44 supplements the carrying medium in the transfer line 34. A similar gas bleed 44 under control of valve 45 is adapted to aid in the discharge from the line 18.

In normal operations, the reactor 8 is usually filled with a catalyst which is maintained in random motion by the liquid and gas flow at 46 at such a velocity that a level indicated at 47 is readily maintained. It will be understood that the level 47 is the so-called "ebullated" bed level which is the result of the bed expansion due to the upflow of liquid and gas. This expansion is from 10% to about 100% of the settled bed level whereby the benefits of the Johanson patent are obtained.

By controlling the liquid and gas velocity as disclosed in the Johanson Patent 2,987,465 the solids tend to separate from the oil within the reactor 8 and the liquid above the catalyst level is substantially free of solids. A liquid level, above which are vapors, is preferably maintained at 48.

From this solids-free liquid zone 50, some of the liquid is recycled back to a point below the catalyst bed as by the recycle pipe 52, and pump 54. The catalyst is conveniently supported by the perforated partition 56 which usually has bubble caps thereon as disclosed in the U.S. Patent No. 3,197,288 of Johanson. A net liquid product is removed at 58.

The effluent vapors discharged through the overhead vapor line 60 and pass through the heat exchanger 62 wherein they are suitably cooled as by coolant entering at 64 and removed at 66. The total overhead product is then removed through the line 68 into the separator 70 from which a hydrogen stream may be recovered at 72 and an oil stream in line 74.

Step 5.—Remove catalyst

In an apparatus of this type, particularly adapted to hydrogenation of hydrocarbons, the pressure in the reation zone is in the order of 1500 to 5000 p.s.i.g. and as the catalyst becomes poisoned or less active, it is desirable to remove it. This is accomplished by the use of a catalyst withdrawal line 80 preferably water jacketed and operating through valve 82 which is connected to the lower pressure separator 70. The desired amount of catalyst may thus be removed directly into the separator 70 without passing through the heat exchanger 62. The catalyst may subsequently be removed from the oil in line 74 as by settling, centrifuging or other means.

Utilizing a line 80 as small as one inch in diameter, it is possible to purge one pound of catalyst per barrel of oil without settling out of the catalyst in any of the down stream equipment. A hydrogen line 84 is conveniently used to control the pressure in line 80, it being apparent that if the valve 86 is closed, and valve 82 is open, the catalyst will flow from the high pressure reactor 8 to the lower pressure separator 70. If, however, the valve 86 is open to permit a back pressure of hydrogen in line 84, flow ceases.

With such a construction it is thus possible to control the catalyst removal in a continuous or intermittent manner.

While I have shown a preferred form of embodiment of my invention, I am aware that modifications may be made thereto within the scope and spirit of the description herein and of the claims appended hereinafter.

I claim:
1. The method of maintaining an average inventory of particulate solids in a pressurized reaction zone without substantial pressure drop which comprises:
 (a) introducing the particulate solids to a solids holding zone which is open to the atmosphere and contains atmospheric gases therein and then;
 (b) purging the solids holding zone of gases by pumping oil therethrough;
 (c) sealing the solids holding zone from the atmosphere and then;
 (d) pressurizing the solids holding zone to about the pressure of the reaction zone by pumping oil into the solids holding zone and then;
 (e) transferring the particulate solids in liquid phase transport to the reaction zone by exiting oil from the solids holding zone and introducing it to the reaction zone;
 (f) removing solids from the upper part of the reaction zone through a flow line to a zone of lower pressure at a rate corresponding to the rate of transfer of solids into the reaction zone, by applying an external gas under pressure to the flow line.

2. The method of claim 1 wherein the atmospheric gases are purged into an expansion zone prior to sealing the holding zone.

3. The method of claim 1 wherein a uniform linear velocity of solids and oil in the transfer line is controlled by diverting oil around the holding zone.

4. The method of claim 2 wherein approximately half of the oil from the holding zone is discharged to the expansion zone to permit refilling the holding zone with solids.

5. A process for the addition of a particulate contact material to a high pressure reaction zone which comprises:
 (a) introducing the contact material to a solids holding zone which is open to the atmosphere and contains atmospheric gases therein;
 (b) purging the solids holding zone of the atmospheric gases by pumping oil therethrough;
 (c) sealing the solids holding zone from the atmosphere;
 (d) pressuring the solids holding zone to about the pressure of the reaction zone by pumping oil into the solids holding zone and then;
 (e) transferring the contact material by liquid phase transport to the reaction zone from the holding zone solely by the pressure buildup in the holding zone.

6. The method of claim 5 wherein the gases are purged into an expansion zone prior to sealing the solids holding zone.

7. The process as claimed in claim 5 wherein subsequent to the transfer of the contact material to the reaction zone, the solids holding zone is depressurized by ceasing to pump the oil therethrough and purging the oil therein to an expansion zone.

8. The method of claim 5 wherein the solids holding zone is initially purged of atmospheric gases before the solids are directed to the transfer line.

References Cited

UNITED STATES PATENTS

| | | | |
|---|---|---|---|
| 2,441,820 | 5/1948 | Jewell | 208—157 |
| 2,486,650 | 11/1949 | Hepp et al. | 208—157 |

DELBERT E. GANTZ, *Primary Examiner.*

H. LEVINE, *Assistant Examiner.*